(12) United States Patent
Olaleye

(10) Patent No.: US 9,580,003 B2
(45) Date of Patent: Feb. 28, 2017

(54) METHODS AND SYSTEMS FOR STARTING AN ELECTRICALLY CONTROLLED ENGINE OF A TRANSPORT REFRIGERATION SYSTEM

(71) Applicant: THERMO KING CORPORATION, Minneapolis, MN (US)

(72) Inventor: Omosola Waidi Olaleye, Brooklyn Park, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 129 days.

(21) Appl. No.: 14/432,864

(22) PCT Filed: Oct. 1, 2013

(86) PCT No.: PCT/US2013/062884
§ 371 (c)(1),
(2) Date: Apr. 1, 2015

(87) PCT Pub. No.: WO2014/055530
PCT Pub. Date: Apr. 10, 2014

(65) Prior Publication Data
US 2015/0274056 A1    Oct. 1, 2015

Related U.S. Application Data

(60) Provisional application No. 61/708,362, filed on Oct. 1, 2012.

(51) Int. Cl.
*B60P 3/20*    (2006.01)
*B60H 1/00*    (2006.01)
(Continued)

(52) U.S. Cl.
CPC ............ *B60P 3/20* (2013.01); *B60H 1/00428* (2013.01); *B60H 1/32* (2013.01); *B60H 1/3232* (2013.01);
(Continued)

(58) Field of Classification Search
CPC .. F02N 11/08; F02N 11/0803; F02N 11/0807; F02N 11/087; F02N 2011/0874;
(Continued)

(56) References Cited

U.S. PATENT DOCUMENTS 4,780,618 A * 10/1988 Wareman ................ B60P 3/20
123/142.5 R
5,140,826 A * 8/1992 Hanson .............. B60H 1/00014
123/142.5 R
(Continued)

FOREIGN PATENT DOCUMENTS

CN    101282857    10/2008
CN    102338013    2/2012
(Continued)

OTHER PUBLICATIONS

Chinese Office Action issued in corresponding Chinese Application No. 2013800610913 dated Jun. 29, 2016 (9 pages); English Translation.
(Continued)

*Primary Examiner* — Stephen K Cronin
*Assistant Examiner* — Kevin R Steckbauer
(74) *Attorney, Agent, or Firm* — Hamre, Schumann, Mueller & Larson, P.C.

(57) ABSTRACT

Embodiments of systems and methods for starting an electronically controlled engine of a TRS by supplying power from a battery, are provided. The engine is electronically controlled by an engine control unit (ECU). The systems and
(Continued)

methods can achieve a complete engine start even when the ECU experiences a reset during the startup of the engine.

14 Claims, 6 Drawing Sheets

(51) Int. Cl.
*B60H 1/32* (2006.01)
*F02N 11/08* (2006.01)

(52) U.S. Cl.
CPC ............ *F02N 11/08* (2013.01); *F02N 11/087* (2013.01); *F02N 2011/0874* (2013.01); *F02N 2200/063* (2013.01); *F02N 2250/02* (2013.01); *F02N 2300/304* (2013.01); *F25B 2327/001* (2013.01)

(58) Field of Classification Search
CPC ......... F02N 2011/0877; F02N 2250/02; F25B 2327/001; B60H 1/3232; B60P 3/20; G07C 2009/00301
See application file for complete search history.

(56) References Cited

U.S. PATENT DOCUMENTS

| | | | |
|---|---|---|---|
| 5,345,901 A * | 9/1994 | Siegenthaler | F02N 11/10 123/179.3 |
| 5,456,088 A * | 10/1995 | Hanson | B60H 1/3232 62/157 |
| 5,557,938 A | 9/1996 | Hanson et al. | |
| 5,557,941 A * | 9/1996 | Hanson | B60H 1/3232 165/268 |
| 6,176,212 B1 | 1/2001 | Vilou | |
| 6,232,674 B1 * | 5/2001 | Frey | H02J 7/1423 307/10.1 |
| 6,497,209 B1 * | 12/2002 | Karuppana | F02N 11/08 123/179.3 |
| 6,760,659 B1 * | 7/2004 | Cowen | F02D 41/2422 700/287 |
| 6,901,765 B2 | 6/2005 | Amaral et al. | |
| 6,952,642 B1 * | 10/2005 | Cowen | F02D 41/2422 123/339.23 |
| 7,210,049 B2 * | 4/2007 | Disser | G06F 1/3209 701/36 |
| 7,673,466 B2 * | 3/2010 | Pacy | B60H 1/00014 62/236 |
| 7,798,128 B2 | 9/2010 | Bellistri et al. | |
| 7,874,169 B2 | 1/2011 | Leroy | |
| 7,878,013 B2 * | 2/2011 | Matsuno | B60P 3/20 62/228.1 |
| 8,151,581 B2 * | 4/2012 | Chen | B60H 1/004 62/157 |
| 8,295,950 B1 * | 10/2012 | Wordsworth | B60H 1/00428 307/86 |
| 8,536,834 B2 * | 9/2013 | Fink | B60P 3/20 320/128 |
| 8,577,575 B2 * | 11/2013 | Tomura | B60W 10/06 180/337 |
| 8,590,330 B2 * | 11/2013 | Walker | F25D 29/003 62/236 |
| 9,407,108 B2 * | 8/2016 | Muralidhar | B60P 3/20 |
| 9,434,237 B2 * | 9/2016 | Olaleye | B60H 1/00792 |
| 2003/0141049 A1 | 7/2003 | Kennedy | |
| 2004/0262995 A1 | 12/2004 | Hawkins | |
| 2005/0109499 A1 | 5/2005 | Iwanami et al. | |
| 2007/0052241 A1 * | 3/2007 | Pacy | B60H 1/00014 290/1 R |
| 2007/0084444 A1 | 4/2007 | Bellistri et al. | |
| 2009/0229288 A1 | 9/2009 | Alston et al. | |
| 2009/0293522 A1 | 12/2009 | Miyazaki | |
| 2010/0000241 A1 | 1/2010 | Kitano et al. | |
| 2011/0301762 A1 * | 12/2011 | Walker | F25D 29/003 700/275 |
| 2012/0017618 A1 | 1/2012 | Price et al. | |
| 2012/0159971 A1 * | 6/2012 | Fink | B60P 3/20 62/56 |
| 2012/0167605 A1 * | 7/2012 | Ikemiya | B60H 1/3232 62/126 |
| 2012/0323407 A1 * | 12/2012 | Koike | B60R 25/04 701/2 |
| 2013/0289762 A1 * | 10/2013 | Olaleye | G05B 19/4189 700/228 |
| 2015/0183292 A1 * | 7/2015 | Muralidhar | F25D 11/003 62/61 |
| 2015/0291005 A1 * | 10/2015 | Olaleye | B60P 3/20 702/183 |

FOREIGN PATENT DOCUMENTS

| | | |
|---|---|---|
| EP | 1790921 | 5/2007 |
| JP | 2000213850 | 8/2000 |
| WO | 2012/045056 | 4/2012 |
| WO | 2012087626 | 6/2012 |

OTHER PUBLICATIONS

First Search Issued in corresponding Chinese Application No. 2013800610913 dated Jun. 29, 2016 (1 page); English translation.
International Search Report and Written Opinion for International Application PCT/US2013/062884, dated Jan. 6, 2014, 12 pgs.
Supplementary European Search Report issued in corresponding European Application No. 13843502.9 dated Oct. 20, 2016 (9 pages).

* cited by examiner

Reset + Loss of synchronization

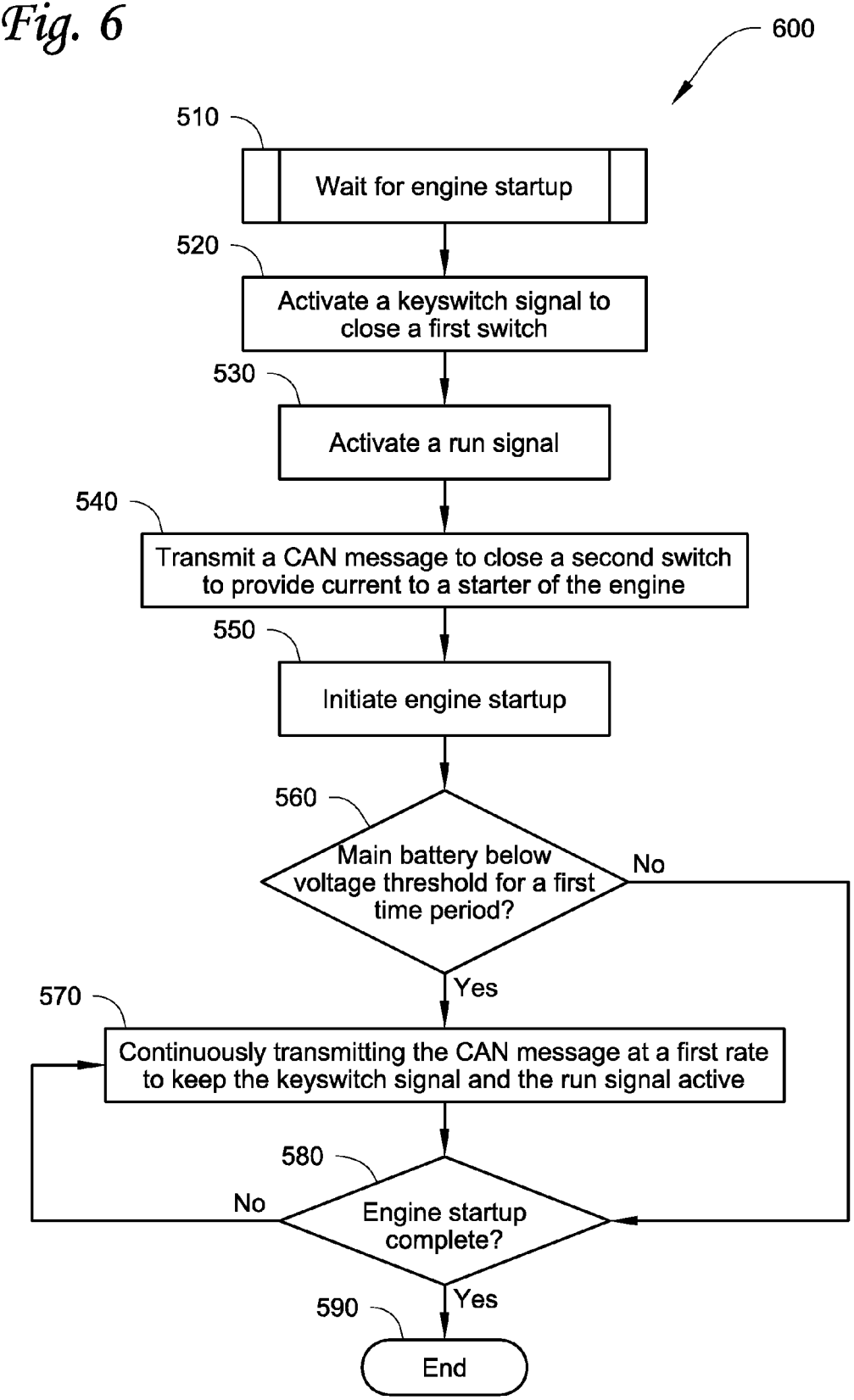

METHODS AND SYSTEMS FOR STARTING AN ELECTRICALLY CONTROLLED ENGINE OF A TRANSPORT REFRIGERATION SYSTEM

FIELD OF TECHNOLOGY

The embodiments disclosed herein relate generally to a transport refrigeration system (TRS). More specifically, the embodiments described herein relate to a TRS including an electronically controlled engine.

BACKGROUND

Existing transport refrigeration systems are used to cool containers, trailers, railcars or other similar transport units (typically referred to as a "refrigerated transport unit"). Modern refrigerated transport units are commonly used to transport perishable items such as produce and meat products. In such a case, the transport refrigeration systems are used to condition the air inside a cargo space of the transport unit, thereby maintaining a desired temperature and humidity during transportation or storage. Typically a transport refrigeration unit (TRU) is attached to the transport unit to facilitate a heat exchange between the air inside the cargo space and the air outside of the transport unit.

SUMMARY

The embodiments described herein relate to systems and methods for starting an electronically controlled engine of a TRS by supplying power from a battery to the electronically controlled engine.

In some embodiments, the electronically controlled engine includes an engine control unit (ECU). The embodiments described herein can start the electronically controlled engine with a low supply voltage, and can achieve a complete engine start even when the ECU receives a reset instruction during the startup of the electronically controlled engine.

The embodiments provided herein can improve engine starting performance with a low voltage supply. When a battery for supplying power to an engine works in an extremely cold weather, and/or the battery has a poor battery condition, it is common for the battery to provide an amount of power with a low voltage for the engine. With the low voltage supply, the battery may stop providing power to an engine starter when the engine is set to a pre-crank state and the engine may not be completely started. The embodiments provided herein allow the battery to supply power to the engine starter continuously until the electronically controlled engine is completely started.

In one embodiment, a method of starting an electronically controlled engine of a transport refrigeration system (TRS), is provided. The electronically controlled engine is configured to supply power to a transport refrigeration unit (TRU) of the TRS. The electronically controlled engine includes an engine control unit (ECU). The TRU includes a TRS controller. The electronically controlled engine further includes a starter for initiating the engine's operation. The method includes activating a keyswitch signal, via the TRS controller, for closing a first switch of the ECU to supply current from a battery to the ECU; and activating a run signal via the TRS controller to set the ECU and the electronically controlled engine in a pre-crank state. The method further includes transmitting a CAN (Controller Area Network) message, via the TRS controller, for closing a second switch of the ECU to supply power from the battery to the starter. When the battery is in a low voltage profile for a first period of time, the CAN message is transmitted at a predetermined rate to keep the keyswitch signal and the run signal active. By receiving the CAN message, the first switch and the second switch are held in a closed state for a predetermined second period of time. The second period of time is longer than the first period of time.

In another embodiment, a system for starting an electronically controlled engine of a transport refrigeration system (TRS), is provided. The TRS includes a transport refrigeration unit (TRU) and the electronically controlled engine is configured to supply power to the TRU. The TRS includes a TRS controller, an engine control unit (ECU), and a TRS controller to ECU interface. The TRS controller to ECU interface includes a keyswitch signal connection configured to send a keyswitch signal, a CAN communication connection configured to send a CAN message, and a run signal connection configured to send a run signal. A starter control is configured to control power supply from a battery to a starter. The starter control includes a starter relay that includes a relay activator and a couple of contacts. The ECU includes a first switch configured to control an ECU main relay, and a second switch to control the starter relay. The relay activator o the starter relay is supplied power by the battery, a starter relay output of the TRS controller, or the keyswitch signal connection. One of the contacts of the starter relay is connected to a starter coil of the starter, and the other of the contacts is connected to the battery.

BRIEF DESCRIPTION OF THE DRAWINGS

Referring now to the drawings in which like reference numbers represent corresponding parts throughout.

FIG. 6 illustrates a schematic of a portion of a TRS for starting an electronically controlled engine with a low supply voltage, according to a fifth embodiment.

DETAILED DESCRIPTION

The embodiments described herein relate to systems and methods for starting an electronically controlled engine of a TRS by supplying power from a battery to the electronically controlled engine.

In some embodiments, the electronically controlled engine includes an engine control unit (ECU). The embodiments described herein can start the electronically controlled engine with a low supply voltage, and can achieve a complete engine start even when the ECU receives a reset instruction during the startup of the electronically controlled engine.

References are made to the accompanying drawings that form a part hereof, and in which is shown by way of illustration of the embodiments in which the methods and systems described herein may be practiced. The term "refrigerated transport unit" generally refers to, for example, a conditioned trailer, container, railcars or other type of transport unit, etc. The term "transport refrigeration system" or "TRS" refers to a refrigeration system for controlling the refrigeration of an in conditioned space of the refrigerated transport unit. The term "conditioned air" refers to air that has been treated so as to maintain a desired condition, for example, desired temperature or desired moisture control. The term "conditioned space" or "conditioned environment" refers to a space, a zone or an environment that receives the treated air.

It will be appreciated that the embodiments described herein may be used in any suitable transport unit such as a ship board container, an air cargo cabin, an over the road truck cabin, etc.

Figure 1:
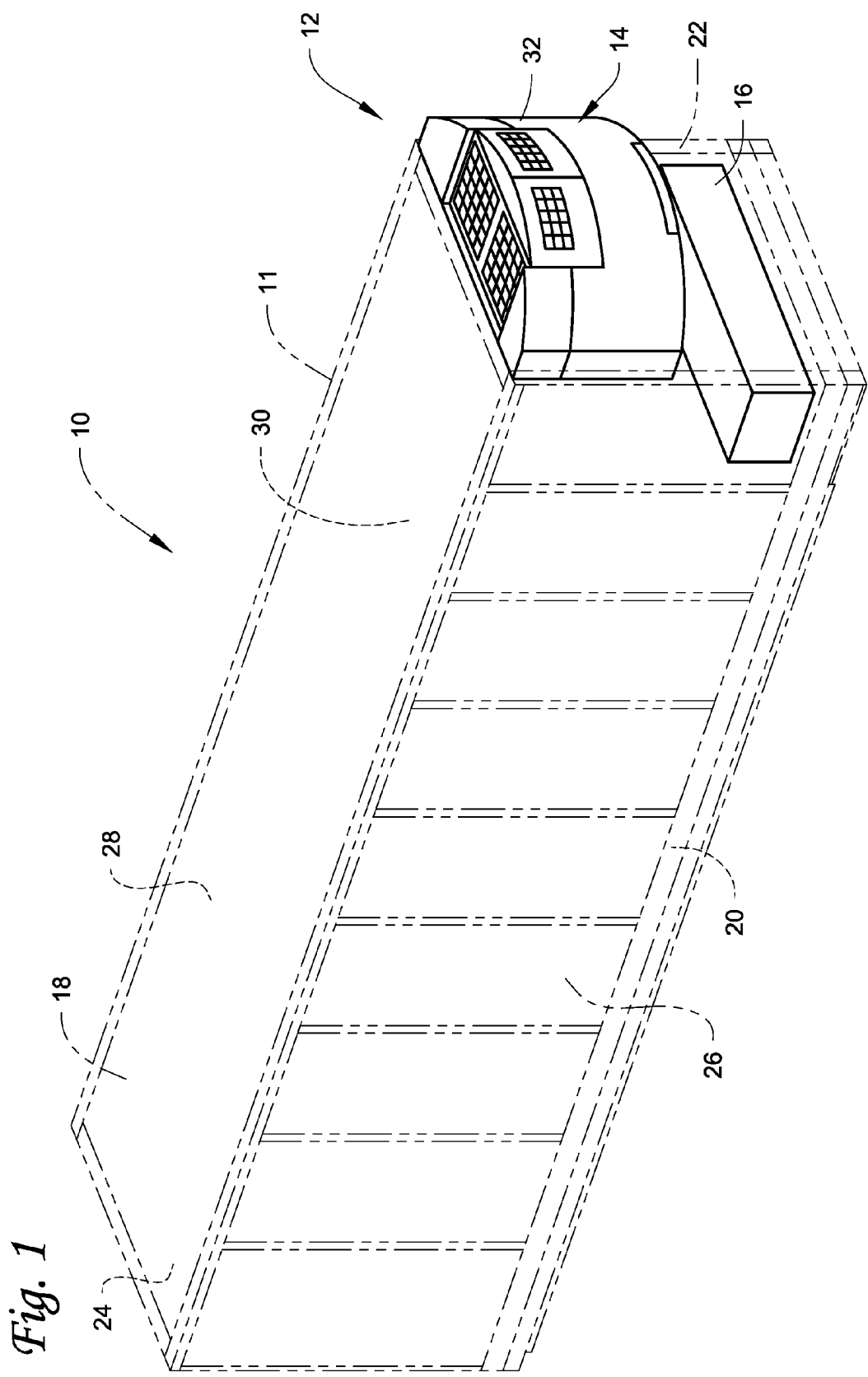
FIG. 1 illustrates a side perspective view of a conditioned transport unit with a TRS, according to one embodiment.

FIG. 1 illustrates a side view of a refrigerated transport unit 10 that includes a transport unit 11 and a transport refrigeration system (TRS) 12. The TRS 12 includes a transport refrigeration unit (TRU) 14 connected to a generator set (genset) 16. The transport unit 11 includes a roof 18, a floor 20, a front wall 22, a rear wall 24, and opposing sidewalls 26, 28. The TRU 14 is positioned on the front wall 22 of the transport unit 11. A conditioned cargo space 30 is defined by the roof 18, the floor 20, the front wall 22, the rear wall 24, and the opposing sidewalls 26, 28. The TRS 12 is configured to transfer heat between the conditioned cargo space 30 and the outside environment.

As shown in FIG. 1, the TRU 14 is enclosed in a housing 32. The TRU 14 is in communication with the conditioned cargo space 30 and controls the temperature in the conditioned cargo space 30. The TRU 14 includes a closed refrigerant circuit (not shown) powered by the genset 16, which regulates various operating conditions (e.g., temperature, humidity, etc.) of the conditioned cargo space 30 based on instructions received from a TRS controller (not shown). The TRU 14 includes a TRS controller (not shown) that regulates various operating conditions (e.g., temperature, humidity, etc.) of the conditioned cargo space 30 and is powered by the generator set 16. The TRU 14 also includes a closed refrigerant circuit (not shown). The closed refrigerant circuit regulates various operating conditions (e.g., temperature, humidity, etc.) of the conditioned cargo space 30, and includes an Electronic Throttle Valve (ETV, not shown), a compressor (not shown) coupled to a condenser (not shown) and an evaporator (not shown) that cools the conditioned cargo space 30 and any perishable cargo contained therein.

The generator set 16 generally includes an electronically controlled engine (not shown), an electronic controller unit (ECU) (not shown), a fuel container (not shown) and a generator (not shown). The electronically controlled engine may be an internal combustion engine (e.g., diesel engine, etc.) that may generally have a cooling system (e.g., water or liquid coolant system), an oil lubrication system, and an electrical system (none shown). An air filtration system (not shown) filters air directed into a combustion chamber (not shown) of the engine. In some embodiments the engine is not specifically configured for the TRS 12, but can be a non-industrial engine such as, for example, an automotive engine. The fuel container is in fluid communication with the engine to deliver a supply of fuel to the engine.

The electronically controlled engine is further controlled by the ECU. The ECU can be configured to regulate an amount of fuel delivered to the electronically controlled engine and can be configured to operate the electronically controlled engine at multiple speeds. The ECU is generally configured to allow the electronically controlled engine to be maintained at a chosen speed regardless of the load seen by the engine. As discussed in more detail below, the ECU is connected to and communicates with the TRS controller.

While the transport unit 11 in FIG. 1 is directed to a trailer type transport unit, it will be appreciated that the embodiments directed to systems and methods in the TRS 12 for a low voltage engine start can also be used, for example, in a truck type transport unit, a container type transport unit, etc.

Figure 2:
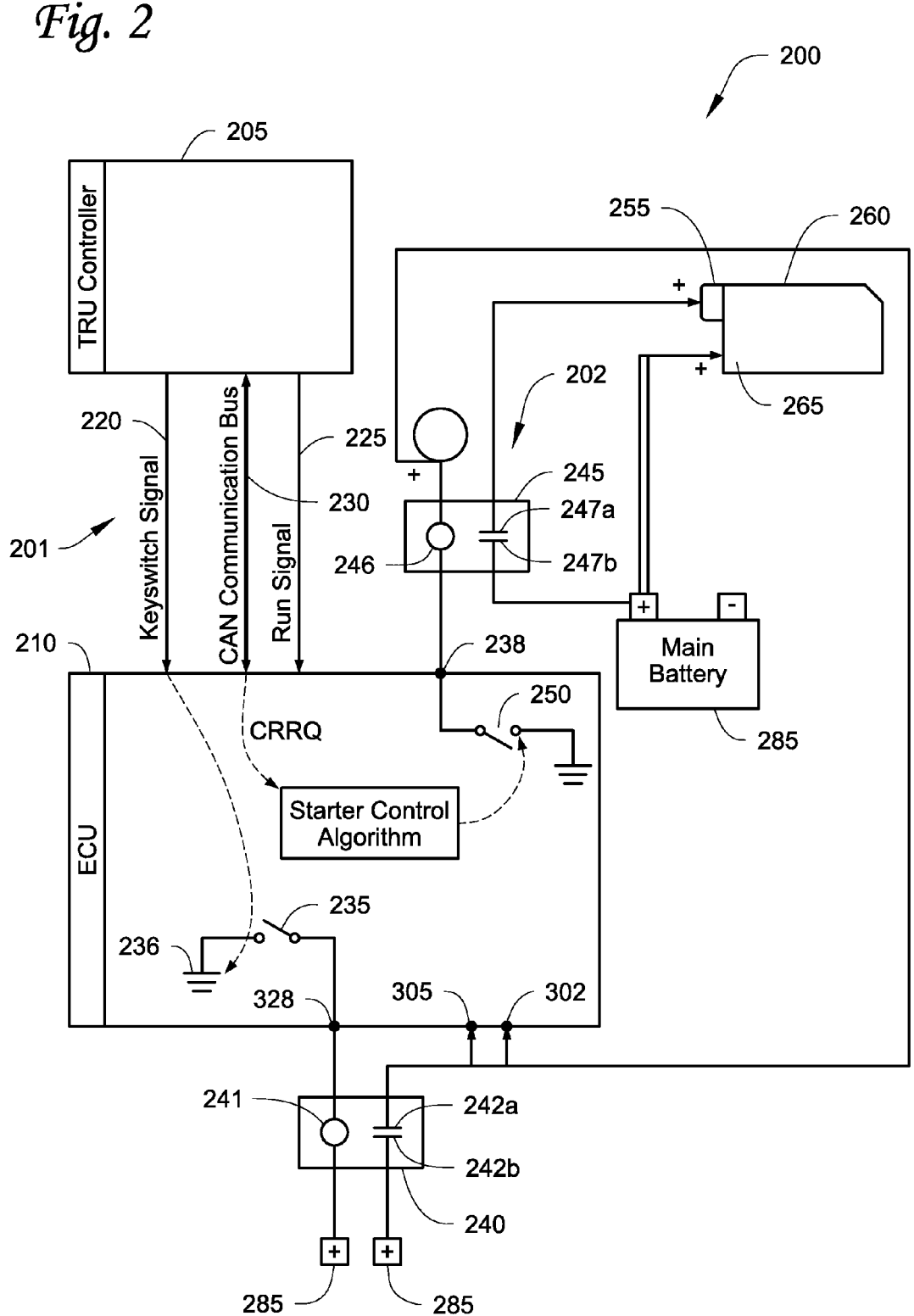
FIG. 2 illustrates a schematic of a portion of a TRS for starting an electronically controlled engine with a low supply voltage, according to a first embodiment.

FIG. 2 illustrates a schematic of a portion of a TRS 200 for starting an electronically controlled engine with a low supply voltage, according to a first embodiment. The TRS 200 includes a TRS controller 205, an engine control unit (ECU) 210, a TRS controller to ECU interface 201 connecting the TRS controller 205 and the ECU 210, and a starter control 202 configured to control a starter 260 for initiating an engine startup. In some embodiments, the ECU 210 can be a part of an electronically controlled engine (not shown) of a TRS.

The TRS controller to ECU interface 201 includes a keyswitch signal connection 220 that is configured to send a keyswitch signal from the TRS controller 205 to the ECU 210, a run signal connection 225 that is configured to send a run signal from the TRS controller 205 to the ECU 210, and a CAN (Controller Area Network) communication connection 230 that is configured to provide two-way communication between the TRS controller 205 and the ECU 210.

The keyswitch signal connection 220 is configured to enable the ECU 210 for an engine sub-system operation, disable the ECU 210, and to facilitate TRS power management. In one embodiment, the keyswitch signal connection 220 can perform the above functions by invoking a high/active logic state and/or a low/inactive logic state. When in the high/active logic state, the keyswitch signal connection 220 is configured to enable communication between the TRS controller 205 and the electronically controlled engine via the ECU 210. When the keyswitch signal connection 220 transitions from the high/active logic state to the low/inactive logic state, the ECU 210 is configured to enter a power latch stage prior to completely shutting off. The ECU 210 is configured to command a pre-shutdown component calibration and is configured to write data to permanent memory.

The run signal connection 225 is configured to, via the ECU 210, prepare the engine for starting, instructing the electronically controlled engine to stop, reinitializing an ECU 210 start routine, and managing power consumption of the TRS generally. In one embodiment, the run signal connection 225 can perform the above functions by invoking a high/active logic state and/or a low/inactive logic state. When in the high/active logic state, the run signal connection 225 is configured to prepare the electronically controlled engine, via the ECU 210, for starting. When the run signal connection 225 transitions from the high/active logic state to the low/inactive logic state and the electronically controlled engine is running, the run signal connection 225 is configured to instruct the electronically controlled engine, via the ECU 210, to stop. This reduces power consumption of a unit main battery 285 while still allowing data communication between the ECU 210 and TRS controller 205 via the CAN communication connection 230.

The CAN communication connection 230 is configured to facilitate communication between the TRS controller 205 and the ECU 210. In particular, the CAN communication connection 230 is configured to transmit data messages from the TRS controller 205 to the ECU 210 that include, for example, an engine crank command message, an engine target speed command message, an engine stop request message, etc. Accordingly, the TRS controller 205 can instruct the electronically controlled engine, via the ECU 210, to stop via the run signal connection 225 or the CAN communication connection 230. The CAN communication connection 230 is also configured to transmit data messages from the ECU 210 to the TRS controller 205 that include, for example, an engine requested speed or speed limit (including message counter and message checksum), an engine crank request limit (including message counter and message checksum), an engine percent load at a current speed, an actual engine percent torque, an engine speed, an engine starter mode, an engine demand percent torque, engine operating information (limit including an engine operating state, message counter and message checksum), engine shutdown information (including engine wait to start lamp information), engine hours and/or revolutions (including engine total hours of operation), fuel consumption (including engine total fuel used), engine temperatures (including an engine coolant temperature, engine fuel temperature, and engine intercooler temperature), engine fluid levels or pressures (including an engine oil level, an engine oil pressure, and an engine coolant level), engine economy information (including an engine fuel rate), ambient conditions (including a barometric pressure and an engine air intake temperature), a keyswitch battery potential, water-in-fuel information, an intercooler fan request, a coolant fan request limit (including message counter and message checksum), active diagnostic messages, previously active diagnostic messages, diagnostics data clear/reset of previously active DTC, freeze frame PG that tells what DTC caused it, test results for premature DTC's, clear diagnostic information for active DTCs, etc.

The ECU 210 includes an ECU enable switch 235 that is connected to an ECU main relay 240 via a pin 328. The ECU main relay 240 includes a relay activator 241 and contacts 242a and 242b which are closed when the relay activator 241 is activated. In one embodiment, the relay activator 241 is a relay activator which when provided with current can close the contacts 242a and 242b. The relay activator 241 connects to the pin 328 at one side and to the unit main battery 285 at the other side. The contact 242a connects to pins 305 and 302 at one end and the contact 242b connects to the unit main battery 285 at the other end. The pin 328 connects to a circuit (not shown) that is configured to control an amount of power supply from the unit main battery 285 to the ECU 210 via the pins 305 and 302. The unit main battery 285 can be, for example, a 12 V DC battery that can have a supply voltage up to a maximum voltage, for example, about 12 V. The unit main battery 285 is configured to supply an amount of power for the TRS 200 and a starter 260 of an electronically controlled engine. In some embodiments, a battery other than a 12 V DC battery can be used.

A supply voltage from the unit main battery 285 can be lower than the maximum voltage, for example, when the unit main battery works in extremely cold weather, such as, for example, about −40° F. to 0° F. (~−40° C. to ~−17.8° C.), has poor battery conditions, etc.

The starter control 202 includes a starter relay 245 that is configured to control an amount of power supply from the unit main battery 285 to the starter 260. The starter relay 245 includes a starter relay activator 246, and starter relay contacts 247a and 247b. The starter relay activator 246 connects to the contact 242a at one side and to a switch 250 of the ECU 210, via a pin 238, at the other side. The starter relay contact 247a connects to a starter pull-in coil 255 of a starter 260 and the starter relay contact 247b connects to the unit main battery 285. The pin 238 includes circuits configured to control an amount of power supply from the unit main battery 285 to the starter relay 245.

The starter 260 includes the starter pull-in coil 255 that is connected to the starter relay contact 247a and a starter main coil 265 connected to the unit main battery 285. The starter 260 is powered by the unit main battery 285 to initiate engine startup.

The ECU enable switch 235 is configured to be closed when the keyswitch signal connection 220 sends a keyswitch signal from the TRS controller 205 to the ECU 210. When the ECU enable switch 235 is closed, current is configured to flow from the unit main battery 285 to an internal ECU ground 236 through the relay activator 241 and the pin 328. The contacts 242a-b are then configured to close, which allows current to flow from the unit main battery 285 to the ECU 210, via, for example, the pins 305 and 302.

When the TRS controller 205 determines that an engine startup is requested, the run signal connection 225 is configured to send a run signal from the TRS controller 205 to the ECU 210 and a run signal voltage potential can be set, for example, from a low-level to a high-level, on one side of the starter relay activator 246. The current does not flow through the pin 238 when the switch 250 is open, and the starter relay contacts 247a and 247b are open. In this state, the ECU 210 and the engine (not shown) are in pre-crank state where pre-crank functions can be conducted prior to engine crank. In one embodiment, when the TRS controller 205 receives an instruction to start the engine, the TRS controller 205 activates a run relay operation of the TRS controller 205 followed by sending the run signal and the engine enters the pre-crank state. The pre-crank functions can include one or more of fuel priming, warning buzzer activation, engine pre-heating, etc.

When the pre-crank functions have been completed, the TRS controller 205 can initiate an engine start function by transmitting a CAN message, via the CAN communication connection 230, to the ECU 210. The CAN message includes a crank request (CRRQ) message that contains instructions from the TRS controller 205 to the ECU 210 to close the switch 250 connected to the pin 238. The starter relay contacts 247a-b are then configured to close to allow the supply of current from the unit main battery 285 to the starter pull-in coil 255. In turn, the starter pull-in coil 255 engages the starter main coil 265 and a cranking of the engine starts. During the cranking, the voltage supplied by the unit main battery 285 to the starter 260 may fall and rise in a cyclic manner such as, for example, as shown in FIG. 3A.

Figure 3A:
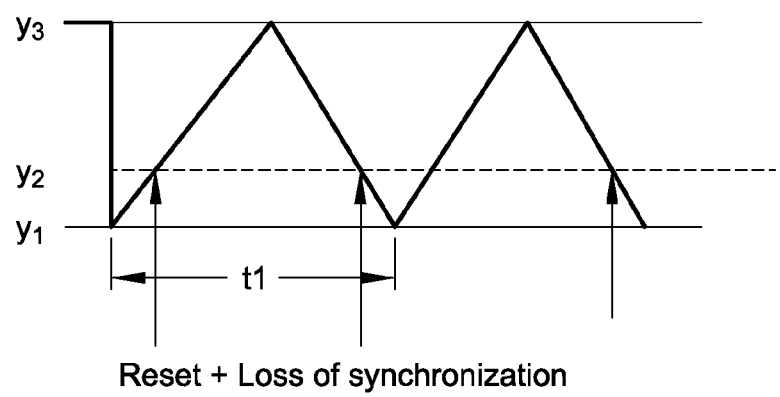
FIG. 3A illustrates a voltage profile supplied by a battery to an electronically controlled engine of a TRS, according to one embodiment.

FIG. 3A illustrates a voltage profile supplied to the starter 260 by the unit main battery 285. The unit main battery 285 has an original voltage of y. During the cranking, the voltage profile oscillates between an upper limit $y_3$ and a lower limit $y_1$ with a period of $t_1$. The upper limit $y_3$ is lower than the original voltage y. When the supply voltage is below a voltage threshold $y_2$ shown in FIG. 3A and the TRS controller 205 does not instruct the switches 235 and 250 to remain closed, the switches 235 and 250 will open. In one embodiment, the original voltage y, the upper limit $y_3$, the lower limit $y_1$, the voltage threshold $y_2$, and the time period $t_1$ are about 12 V, about 7 V, about 5 V, about 5.5V, and about 320 mini-seconds, respectively. It is to be understood that the voltage threshold $y_2$ can vary, for example, from about 5.5 to about 6 V. If the switches 235 and 250 open during the cranking, the ECU 210 can lose power and cannot synchronize data, for example, incapable of computing engine speed information from a camshaft and a camshaft sensor, computing engine fueling command instructions, etc. Loss of synchronization can cause an immediate cessation of fueling which stops the engine startup.

The TRS 200 shown in FIG. 2 can improve engine starting performance even when the supply voltage is below a voltage threshold such as, for example, shown in FIG. 3A. The TRS controller 205 allows the unit main battery 285 to supply power to the engine starter 260 continuously until the electronically controlled engine is completely started. In one embodiment, the TRS controller 205 can continuously transmit the CAN message at a first rate to the ECU 210, to keep the keyswitch signal and the run signal active. The first rate can be much faster than the oscillation frequency (e.g., 1/t1 shown in FIG. 3A) of the voltage profile. In some embodiments, the first rate of transmitting the CAN message can be, for example, about 100 Hz (or 10 mini-seconds in time period). During intervals of receiving the CAN messages, the ECU 210 can be reset. Even if the ECU 210 is reset, transmitting the CAN message at the first rate allows the ECU 210 to receive the CAN message as soon as the ECU 210 completes a reset. This allows the circuits of the pins 238 and 328 to keep the previous instructions (prior to the reset of the ECU 210) from the TRS controller 205 and allows the switches 235 and 250 to remain in a closed position for a second period of time. The engine can be completely started during the second period of time. It is to be understood that the first rate can be faster or slower than 100 Hz, as long as the switches 235 and 250 can remain closed during the second period of time.

Figure 3B:
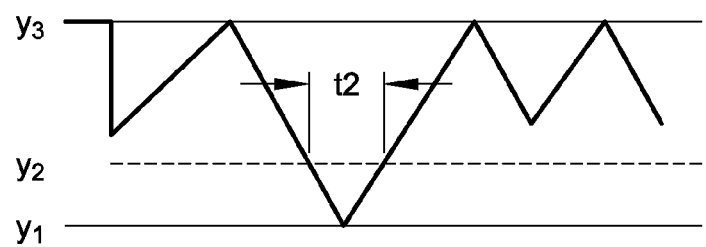
FIG. 3B illustrates a voltage profile supplied by a battery to an electronically controlled engine of a TRS, according to another embodiment.

As shown in FIG. 3B, a voltage profile supplied to the starter 260 by the unit main battery 285 is lower than the threshold voltage $y_2$ for a first period of time $t_2$. In one embodiment, the first period of time $t_2$ can be, for example, 400 mini-seconds. The portion of the TRS 200 is configured to control the switches 235 and 250 to be closed in the manner as described above. The switches 235 and 250 are closed for a second period of time so that an amount of power can be continuously supplied to the ECU 210 and the starter relay 245, respectively, during the second period of time, and the electronically controlled engine can be started completely. In some embodiments, the second period of time is no less than the first period of time $t_2$.

Figure 4:
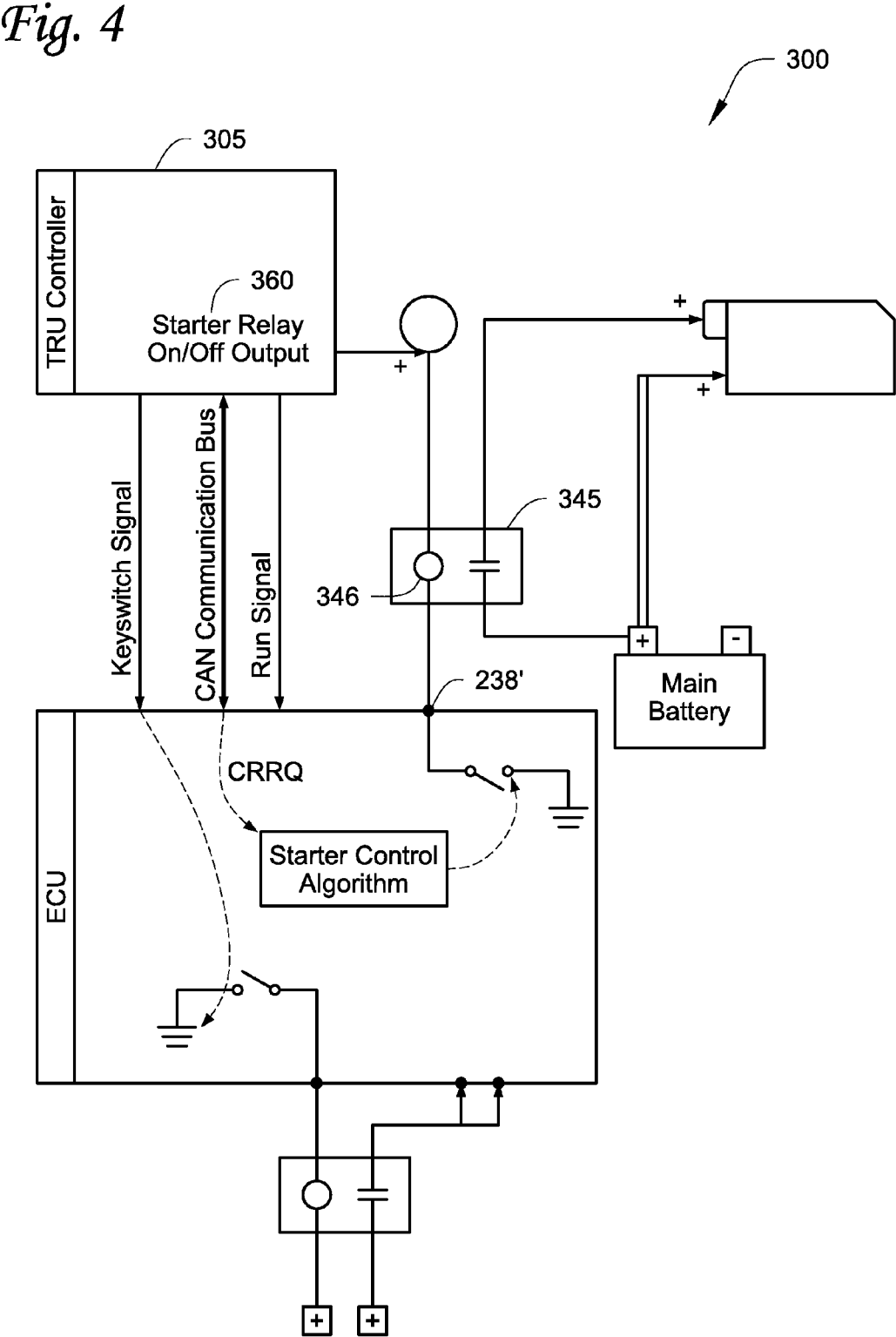
FIG. 4 illustrates a schematic of a portion of a TRS for starting an electronically controlled engine with a low supply voltage, according to a second embodiment.
Figure 5:
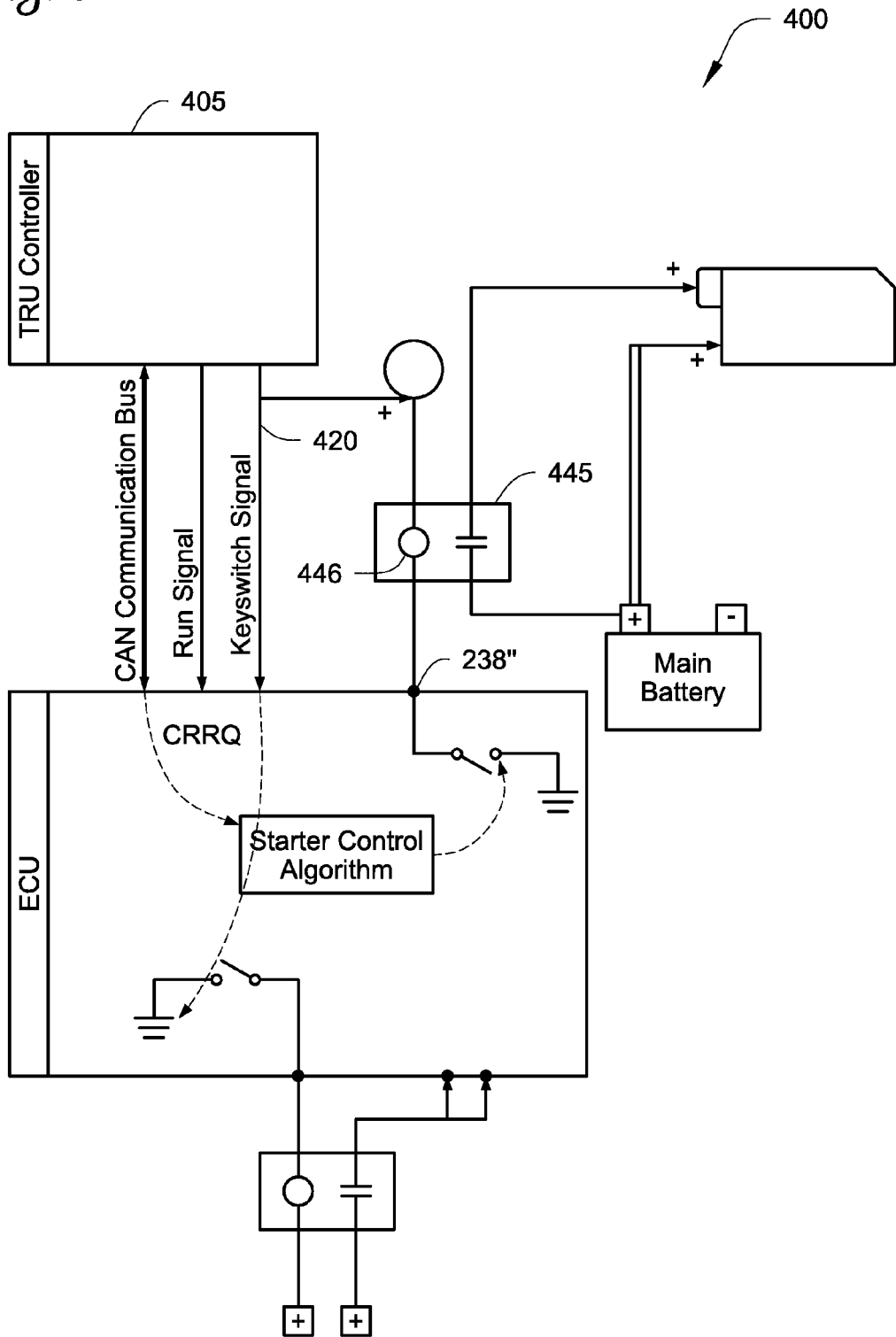
FIG. 5 illustrates a schematic of a portion of a TRS for starting an electronically controlled engine with a low supply voltage, according to a third embodiment.

FIGS. 4 and 5 respectively illustrate schematics of a portion of a TRS 300 and a portion of a TRS 400 for starting an electronically controlled engine with a low supply voltage, respectively, according to other embodiments.

The TRS 300 includes a starter relay 345 that is configured to control the startup of a starter and an electronically controlled engine. The starter relay 345 includes a starter relay activator 346 that connects to a starter relay output 360 of a TRS controller 305 at one side and to a pin 238' at the other side. That is, the starter relay 345 is supplied power by the TRS controller 305, via the starter relay output 360.

The TRS 400 includes a starter relay activator 445 configured to control the startup of a starter and an electronically controlled engine. The starter relay 445 includes a starter relay activator 446 that connects to a keyswitch signal connection 420 at one side and to the pin 238" at the other side. That is, the starter relay 445 is supplied power by the keyswitch signal connection 420.

The embodiments described above in FIGS. 4-5, allow the ECU (e.g., the ECU 210) to provide diagnostic information on the starter relay prior to entering into a pre-crank mode (e.g., as soon as a keyswitch signal is activated by a TRU controller).

FIG. 6 illustrates a flow diagram of a method 600 for starting an electronically controlled engine with a lower supply voltage, according to one embodiment. The method 600 is illustrated as performed by the TRS 200. It is to be understood that the method 600 can also be performed by other systems for starting an electronically controlled engine with a low supply voltage, such as, for example, the TRS 300, 400 as shown in FIGS. 4-5.

At 510, the TRS controller 205 waits for an instruction to being an engine startup. The method 600 then proceeds to 520.

At 520, the TRS controller 205 activates a keyswitch signal, via the keyswitch signal connection 220, to close the ECU enable switch 236. Upon the closure of the ECU enable switch 236, the contacts 242a and 242b are closed and the unit main batter 245 supplies power to the ECU 235. The method 600 then proceeds to 530.

At 530, the TRS controller 205 activates a run signal, via the run signal connection 225. The ECU 210 and the engine (not shown) are in pre-crank state where pre-crank functions can be conducted prior to engine crank. The method 600 then proceeds to 540.

At 540, the TRS controller 205 transmits a CAN message, via the CAN communication connection 230, to close the switch 250. The CAN message includes a crank request (CRRQ) message that contains instructions to the ECU 210 to close the switch 250 on the pin 238. Current is supplied from the unit main battery 285 to flow through the starter relay activator 246, which causes the starter relay contacts 247a-b to close and allows current to be supplied from the unit main batter 245 to the starter pull-in coil 255. The starter pull-in coil 255, in turn, engages the starter main coil 265 and a cranking of the engine starts. The method 600 then proceeds to 550.

At 550, the cranking initiates engine startup. During the cranking, a voltage supplied by the unit main batter 245 to the starter 260 falls and rises in a cyclical manner as shown in FIGS. 3A-B. The method 600 then proceeds to 560.

At 560, the TRS controller 205 determines whether the voltage supplied to the starter 260 is below a voltage threshold for a first time period. In one embodiment as shown in FIGS. 3A-B, the voltage threshold can be about 5.5V. When the supply voltage is below the voltage threshold and the TRS controller 205 does not instruct the switches 235 and 250 to remain closed, the switches 235 and 250 will open. If the supply voltage is below the voltage threshold, the method 600 proceeds to 570. If the voltage is not lower than the voltage threshold, the method 600 proceeds to 580.

At 570, when the supply voltage is below the voltage threshold, the TRS controller 205 continuously transmits the CAN message at a first rate to the ECU 210, to keep the keyswitch signal and the run signal active. In some embodiments, the first rate of transmitting the CAN message can be about 100 Hz. During intervals of receiving the CAN messages, the ECU 210 may be reset. Even if the ECU 210 is reset, transmitting the CAN message at the first rate allows the ECU 210 to receive the CAN message as soon as the ECU 210 completes a reset. This allows circuits at the pins 238 and 328 to keep the previous instructions (prior to the reset of the ECU 210) and the switches 235 and 250 to remain in a closed position. In some embodiments, the TRS controller 205 continuously transmits the CAN message for a second period of time. The second period of time is not shorter than the first period of time during which the supply voltage is lower than the voltage threshold. The method 600 then proceeds to 580.

At 580, the TRS controller 205 determines whether the engine startup completes. If the engine startup has completed, the method 600 proceeds to 590. If the engine startup does not complete, the method 600 proceeds to 570.

At 590, the method 600 ends.

Aspects:

It is noted that any of aspects 1-11, 12, and 13-18 below can be combined with each other.

Aspect 1. A method of starting an engine including an engine control unit (ECU) of a transport refrigeration system (TRS), the method comprising:
transmitting a message, via a TRS controller, to the ECU at a predetermined rate to hold one or more switches of the ECU in a closed state; and
supplying power from a battery to a starter of the engine to start the engine when the battery is in a low voltage profile.

Aspect 2. The method of aspect 1, wherein transmitting the message comprises activating a keyswitch signal, via the TRS controller, to close a first switch of the ECU to supply current from the battery to the ECU.

Aspect 3. The method of aspects 1-2, wherein transmitting the message comprises activating a run signal, via the TRS controller, to set the ECU and the engine to a pre-crank state.

Aspect 4. The method of aspects 1-3, wherein transmitting the message comprises transmitting a CAN (Controller Area Network) message via the TRS controller, to close a second switch of the ECU to supply power from the battery to the starter.

Aspect 5. The method of aspect 4, further comprising keeping the keyswitch signal and the run signal active and holding the first switch and the second switch in a closed state for a predetermined duration, when the battery is in the low voltage profile.

Aspect 6. The method of aspect 5, further comprising determining a low-voltage-profile duration for which the battery is in the low voltage profile, the predetermined duration for which the first and second switches are held in a closed state being longer than the low-voltage-profile duration.

Aspect 7. The method of any of aspects 1-6, wherein the engine is an electronically controlled engine.

Aspect 8. The method of aspect 3, further comprising connecting a first side of a starter relay contact to the battery, connecting a second side of the starter relay contact to a starter coil, and supplying current from the battery to a first side of a starter relay activator when setting the ECU and the engine to the pre-crank state.

Aspect 9. The method of aspect 8, wherein a current carrying contact side of a starter relay is open at the first side.

Aspect 10. The method of aspect 4, further comprising transmitting the CAN message at the predetermined rate to keep the keyswitch signal and the run signal active.

Aspect 11. The method of any of aspects 1-10, wherein the predetermined rate is about 100 Hz.

Aspect 12. A method of starting an electronically controlled engine of a transport refrigeration system (TRS), the electronically controlled engine being configured to supply power to a transport refrigeration unit (TRU) of the TRS, the electronically controlled engine including an engine control unit (ECU), the TRU including a TRS controller, the electronically controlled engine further including a starter for initiating operation of the engine, the method comprising:
activating a keyswitch signal, via the TRS controller, for closing a first switch of the ECU and supplying current from a battery to the ECU;
activating a run signal, via the TRS controller, for setting the ECU and the electronically controlled engine to a pre-crank state, wherein a first side of a starter relay contact is connected to the battery, a second side of the starter relay contact is connected to a starter coil, current is supplied from the battery to a first side of a starter relay activator, and a current carrying contact side of a starter relay is open at the first side; and
transmitting a CAN (Controller Area Network) message via the TRS controller, for closing a second switch of the ECU to supply power from the battery to the starter,
wherein when the battery is in a low voltage profile for a first duration, the CAN message is transmitted at a predetermined rate to keep the keyswitch signal and the run signal active, and the first switch and the second switch are held in a closed state for a predetermined second duration, the predetermined second duration being longer than the first duration.

Aspect 13. A system for starting an electronically controlled engine of a transport refrigeration system (TRS) that includes a transport refrigeration unit (TRU), the electronically controlled engine configured to supply power to the TRU, the system comprising:
a TRS controller;
an engine control unit (ECU);
a TRS controller to ECU interface configured to transmit a message between the TRS controller and the ECU; and
a starter control connected to the ECU and configured to control power supply from a battery to a starter of the engine so that power is supplied from the battery to the starter to start the engine when the battery is in a low voltage profile.

Aspect 14. The system of aspect 13, wherein the TRS controller to ECU interface includes a keyswitch signal connection configured to send a keyswitch signal, a CAN (Controller Area Network) communication connection configured to send a CAN message, and a run signal connection configured to send a run signal.

Aspect 15. The system of any of aspects 13-14, wherein the starter control includes a starter relay, the starter relay includes a relay activator and a plurality of contacts.

Aspect 16. The system of aspect 15, wherein the ECU includes a first switch configured to control an ECU main relay, and a second switch configured to control the starter relay.

Aspect 17. The system of any of aspects 15-16, wherein the relay activator is supplied power by at least one of a starter relay output of the TRS controller and the keyswitch signal connection.

Aspect 18. The system of any of aspects 15-17, wherein a first contact of the plurality of contacts of the starter relay is connected to a starter coil of the starter, and a second of the plurality of contacts is connected to the battery.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

The invention claimed is:

1. A method of starting an engine including an engine control unit (ECU) of a transport refrigeration system (TRS), the method comprising:
   transmitting a message, via a TRS controller, to the ECU at a predetermined rate to hold one or more switches of the ECU in a closed state; and
   supplying power from a battery to a starter of the engine to start the engine when the battery is in a low voltage profile,
   wherein transmitting the message comprises activating a keyswitch signal, via the TRS controller, to close a first switch of the ECU to supply current from the battery to the ECU,
   wherein transmitting the message comprises activating a run signal, via the TRS controller, to set the ECU and the engine to a pre-crank state, and
   wherein transmitting the message comprises transmitting a CAN (Controller Area Network) message via the TRS controller, to close a second switch of the ECU to supply power from the battery to the starter.

2. The method of claim 1, further comprising keeping the keyswitch signal and the run signal active and holding the first switch and the second switch in a closed state for a predetermined duration, when the battery is in the low voltage profile.

3. The method of claim 1, further comprising determining a low-voltage-profile duration for which the battery is in the low voltage profile, the predetermined duration for which the first and second switches are held in a closed state being longer than the low-voltage-profile duration.

4. The method of claim 1, wherein the engine is an electronically controlled engine.

5. The method of claim 1, further comprising transmitting the CAN message at the predetermined rate to keep the keyswitch signal and the run signal active.

6. The method of claim 1, wherein the predetermined rate is about 100 Hz.

7. A method of starting an engine including an engine control unit (ECU) of a transport refrigeration system (TRS), the method comprising:
   transmitting a message, via a TRS controller, to the ECU at a predetermined rate to hold one or more switches of the ECU in a closed state;
   supplying power from a battery to a starter of the engine to start the engine when the battery is in a low voltage profile; and
   connecting a first side of a starter relay contact to the battery, connecting a second side of the starter relay contact to a starter coil, and supplying current from the battery to a first side of a starter relay activator when setting the ECU and the engine to a pre-crank state,
   wherein transmitting the message comprises activating a keyswitch signal, via the TRS controller, to close a first switch of the ECU to supply current from the battery to the ECU,
   wherein transmitting the message comprises activating a run signal, via the TRS controller, to set the ECU and the engine to the pre-crank state.

8. The method of claim 7, wherein a current carrying contact side of a starter relay is open at the first side.

9. A method of starting an electronically controlled engine of a transport refrigeration system (TRS), the electronically controlled engine being configured to supply power to a transport refrigeration unit (TRU) of the TRS, the electronically controlled engine including an engine control unit (ECU), the TRU including a TRS controller, the electronically controlled engine further including a starter for initiating operation of the engine, the method comprising:
   activating a keyswitch signal, via the TRS controller, for closing a first switch of the ECU and supplying current from a battery to the ECU;
   activating a run signal, via the TRS controller, for setting the ECU and the electronically controlled engine to a pre-crank state, wherein a first side of a starter relay contact is connected to the battery, a second side of the starter relay contact is connected to a starter coil, current is supplied from the battery to a first side of a starter relay activator, and a current carrying contact side of a starter relay is open at the first side; and
   transmitting a CAN (Controller Area Network) message via the TRS controller, for closing a second switch of the ECU to supply power from the battery to the starter,
   wherein when the battery is in a low voltage profile for a first duration, the CAN message is transmitted at a predetermined rate to keep the keyswitch signal and the run signal active, and the first switch and the second switch are held in a closed state for a predetermined second duration, the predetermined second duration being longer than the first duration.

10. A system for starting an electronically controlled engine of a transport refrigeration system (TRS) that includes a transport refrigeration unit (TRU), the electronically controlled engine configured to supply power to the TRU, the system comprising:
   a TRS controller;
   an engine control unit (ECU);
   a TRS controller to ECU interface configured to transmit a message between the TRS controller and the ECU; and
   a starter control connected to the ECU and configured to control power supply from a battery to a starter of the engine so that power is supplied from the battery to the starter to start the engine when the battery is in a low voltage profile,
   wherein the TRS controller to ECU interface includes a keyswitch signal connection configured to send a keyswitch signal, a CAN (Controller Area Network) communication connection configured to send a CAN message, and a run signal connection configured to send a run signal.

11. A system for starting an electronically controlled engine of a transport refrigeration system (TRS) that includes a transport refrigeration unit (TRU), the electronically controlled engine configured to supply power to the TRU, the system comprising:
   a TRS controller;
   an engine control unit (ECU);
   a TRS controller to ECU interface configured to transmit a message between the TRS controller and the ECU; and
   a starter control connected to the ECU and configured to control power supply from a battery to a starter of the engine so that power is supplied from the battery to the starter to start the engine when the battery is in a low voltage profile,
   wherein the starter control includes a starter relay, the starter relay includes a relay activator and a couple of contacts.

12. The system of claim 11, wherein the ECU includes a first switch configured to control an ECU main relay, and a second switch configured to control the starter relay.

13. The system of claim 11, wherein the relay activator is supplied power by at least one of a starter relay output of the TRS controller and the keyswitch signal connection.

14. The system of claim 11, wherein a first contact of the plurality of contacts of the starter relay is connected to a starter coil of the starter, and a second contact of the plurality of contacts is connected to the battery.

\* \* \* \* \*